Patented Mar. 10, 1931

1,795,431

UNITED STATES PATENT OFFICE

WILLIS B. KIRKPATRICK, OF HARTSDALE, NEW YORK

MEASURING AND FILLING APPARATUS FOR ICE CANS

Application filed May 26, 1927. Serial No. 194,379.

This invention relates to liquid measuring apparatus and has for its object to provide means for quickly and accurately measuring a desired quantity of water, such for example as the refrigerated water with which cans are filled in the manufacture of ice to produce cakes of uniform size.

Another object is the provision of an apparatus which will save time in filling.

For many years, practically the only apparatus used for filling ice cans has been a float controlled valve in a tank which cuts off the supply, but such construction is not reliable because of valve stuffing box friction, and lost motion, resulting in variations in the quantity of liquid discharged into the cans. So far as I am aware, there is no rapid automatic liquid measuring apparatus in use today for filling ice cans which does not possess a troublesome degree of unreliability, complexity, etc.

According to this invention, I provide one or more tanks or compartments in a single tank wherein refrigerated water is charged in at the bottom until one or more float valves close the top vent to prevent further inflow without attention from the operator. The supply pipe has a valve controlled as hereinafter described. Such float valves, as hollow balls, seat surely and easily, and are to be distinguished from float valves which actuate valves in the supply pipe, as heretofore used. The several receptacles corresponding to the number of cans to be simultaneously filled, each have a bottom gravity discharge pipe and a discharge valve. Measurement is effected by controlling the amount of water discharged when the valves are opened, which I conveniently accomplish by means of interior sleeves adjustable on interior nipples carried by the discharge pipes. The higher the sleeves are adjusted, the less water discharged, and vice versa. The several discharge valves are linked together with the inlet control valve, so that when the inlet is open, the discharges are closed, and vice versa. Thus the operator only has to manipulate the cans to and from filling position adjacent the tank, and can attend to other duties while the tank is filling and discharging without having to watch the valves to save refrigerated water.

Referring to the drawings.

Figure 1:
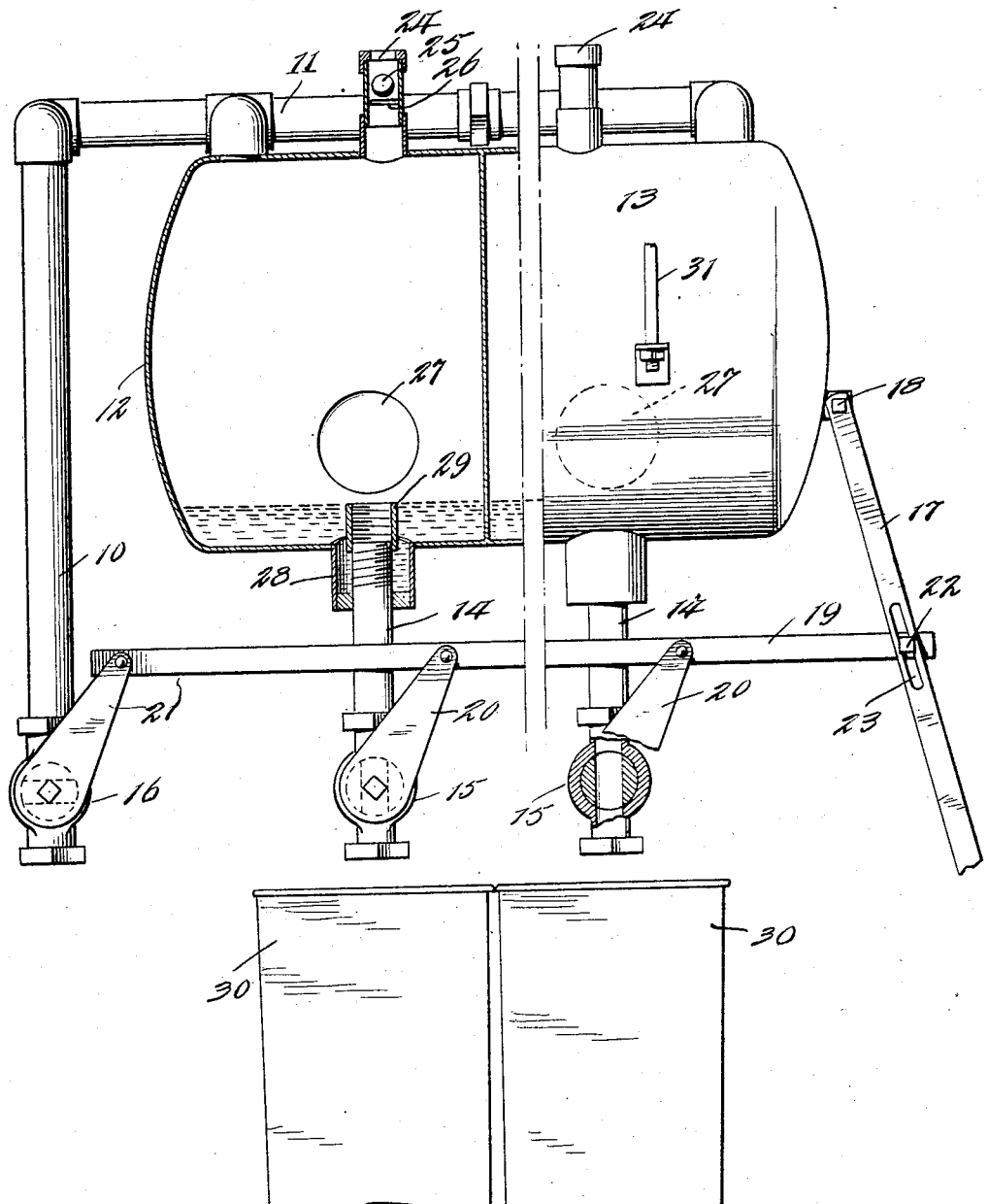
Fig. 1 is a side elevation partly in section of one embodiment of this invention.
Figure 2:
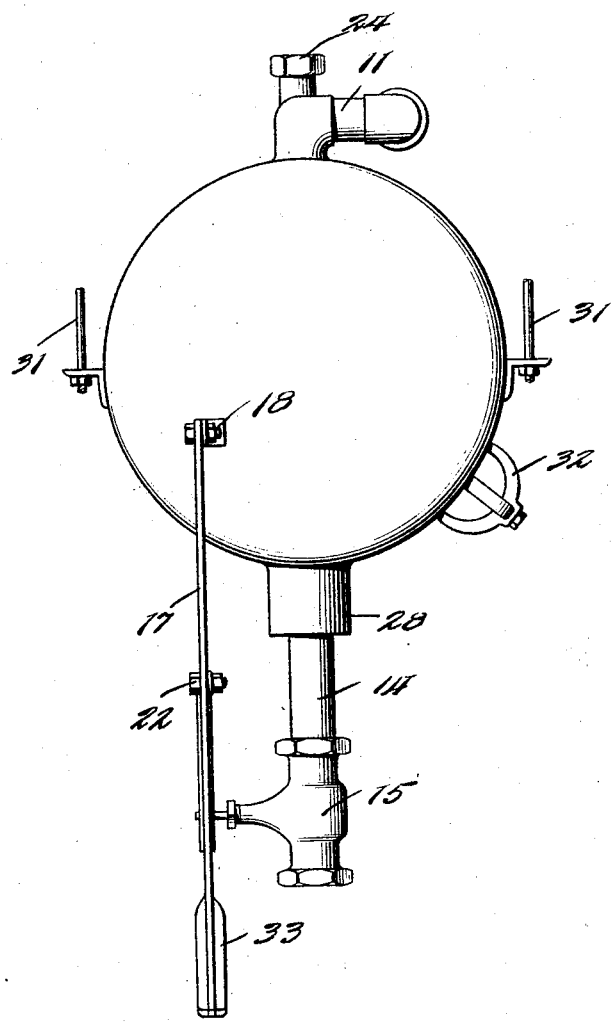
Fig. 2 is an end view of the device of Fig. 1.

This apparatus comprises a series of tanks 12 and 13 having their tops interconnected as by the manifold 11. The supply pipe 10 for refrigerated water containing valve 16 is connected with the manifold 11. In the drawing, only two tanks are illustrated but it will be understood that in practice there are generally a much larger number. A discharge pipe 14 leads from the lower portion of each tank and is provided with a control valve 15. The valves 16 and 15 are preferably of the lubricated packless conical plug type. An actuating lever 17 provided with a handle 33 is pivoted at 18 and connected to the rod 19 which in turn connects through the links 20 and 21 with the respective valves 15 and 16. A bolt or pin 22 slides in the slot 23 in the lever 17 in order to take care of the rise or fall of the rod 19 as the valves are operated. With the actuating mechanism in the position shown the valves 15 are in open position when the valve 16 is closed. On movement of the lever 17 and connecting rod 19 to the left in Fig. 1, the valves 15 will be closed and valve 16 opened.

In the upper portion of each tank is a vent 24 closed by a rubber or metal ball float valve 25 when the liquid rises sufficiently. Each valve 25 normally rests on a support 26 constructed to permit the passage of air past the valve when the valve is resting on said support. As the liquid in the tanks rises the valves 25 close the vents 24. Each tank is provided in its lower portion with a handhole closed by the removable cover 27 having the usual clamping mechanism 32 for retaining it in position. Each discharge pipe 14 is secured within an extension 28 in the lower portion of the tank, and the projecting upper end of each discharge pipe constitutes a nipple which carries an adjustable sleeve 29, shown on the drawing as being threaded on to the nipple. The elevation of this sleeve controls the level of the liquid remaining in the tank after discharge, and in this way accurately controls the amount of liquid discharged into each of the cans 30. The tanks are preferably hung from above by the supports 31 so as to give ample clearance beneath the tanks for bringing up and removal of the cans for filling.

In operation, the series of cans shown in Fig. 1 have just been filled with refrigerated and purified water by opening the discharge valves 15 and closing the supply valve 16. The cans are then removed to the brine circulating system for freezing, and another batch of cans moved up for filling. The operator then moves handle 33 and lever 17 to the left of the position shown in Fig. 1, whereby the valves 15 are closed and valve 16 opened. As soon as valve 16 opens, the liquid flows from the manifold into each of the tanks or compartments until the liquid level rises sufficiently to cause the float valves 25 to close the vents 24. When this has been done, inflow ceases and the apparatus is ready for the opertaor to pull the lever 17 to the right into the position shown in Fig. 1 thereby closing valve 16 and opening valves 15. If the liquid level in one can is found to be slightly above or below that in the rest the extension 29 on the discharge pipe is adjusted on removal of the cover 27 so that the quantity discharged is the same as that discharged from the other compartments.

Among the advantages of this invention may be enumerated the greater accuracy of measurement, quickness, simple construction, and reliability. There is no substantial friction from any heavy moving parts to vary the measurement. Greater precision can be accomplished by a fine adjustment of sleeves 29, which is in essence the means for adjusting the effective volume of each compartment. This means for regulating the amount discharged also compensates for any quantities of water from manifold 11 supplying liquid to the tanks after valves 15 and 16 have been open and closed, respectively.

One of the most essential needs of today in manufacturing ice is a filling apparatus of the type herein described whereby an accurately and easily determined amount of refrigerated and usually purified water can be placed in each can without the possibility of variation in size due to moving parts and without loss of water. The float shut-off valve control devices are in practically universal use today in the ice industry and have given much trouble, although recognized to be unreliable and wasteful in use of water. These devices require continual attention, are expensive to maintain, and are never reliable. The apparatus of this invention overcomes all of the foregoing difficulties and has been uniformly successful in actual practice, and for the first time enables uniform cakes of ice to be produced, which has not heretofore been possible with existing equipment. Uniformity of cakes is not only desirable from the standpoint of satisfaction to customers and to prevent waste of water, but is also extremely desirable where the cakes are scored before being sold to dealers who cut them into small pieces according to the scores for individual customers. Where the cakes are irregular, it is impossible to divide them into equal pieces, so that overweight is given or waste results from the short ends.

Various modifications and changes may be made in the details herein shown without departing from the broad scope of the invention as defined in the appended claims.

I claim:

1. An apparatus for filling a series of ice cans with liquid which comprises a plurality of tanks having connected tops mounted above the ice cans to be filled, a supply pipe connected to fill said tanks, a valve in said supply pipe, vent means for said tanks, discharge means for each tank, control mechanism in the discharge means from each tank, means closing said vent means when the tanks are filled, operating means for the valve in the supply pipe whereby all the tanks are simultaneously connected to the supply pipe, operating means for the discharge control means whereby all the tanks are drained simultaneously, and adjustable means within each tank for controlling the amount of stored liquid therein that can be discharged from each tank.

2. An apparatus for filling a series of ice cans with substantially equal amounts of liquid which comprises a plurality of tanks connected at their tops mounted above the ice cans to be filled, a supply pipe connected to fill said tanks, a valve in said supply pipe, vent means for said tanks, a discharge pipe for each tank, a valve in each discharge pipe, float means closing the vent means when the tanks are filled, operating means for the valve in the supply pipe whereby all the tanks are simultaneously connected to the supply pipe, operating means for the discharge valves whereby all the tanks are drained simultaneously, and coupling means arranged to open and close the supply and discharge simultaneously.

3. An apparatus for filling a series of ice cans with substantially equal amounts of liquid which comprises a plurality of tanks connected at their tops mounted above the ice cans to be filled, a supply pipe connected to fill said tanks, a valve in said supply pipe, venting means for the tanks, float means to close said venting means and automatically stop the inflow when the tanks are filled, a bottom discharge pipe for each tank, a lever attached to the supply valve and each discharge valve, and means coupling all of said levers together and so arranged that as the valve in the supply pipe is opened or closed, the valve in each discharge pipe is simultaneously operated reversely by one movement of the operator.

4. An apparatus for filling a series of ice cans with substantially equal amounts of liquid which comprises a plurality of tanks having interconnected tops mounted above the ice cans to be filled, a supply pipe connected to fill said tanks, a valve in said supply pipe, venting means for the tanks, float means to close said venting means and automatically stop the inflow when the tanks are filled, a bottom discharge pipe for each tank, a valve in each discharge pipe, a lever attached to the supply valve and each discharge valve, means coupling all of said levers together and so arranged that as the valve in the supply pipe is opened or closed, the valve in each discharge pipe is simultaneously operated reversely by one movement of the operator, and adjustable means within each tank for controlling the amount of stored liquid therein that can be discharged from that tank, operable from outside the tank and independently of the adjustable means in the other tanks.

5. An apparatus for filling a series of ice cans with substantially equal amounts of liquid which comprises a plurality of tanks having interconnected tops mounted above the ice cans to be filled, a supply pipe connected to fill said tanks, a valve in said supply pipe, a vent in each tank, float means to close each vent and automatically stop the inflow when that tank is filled, a bottom discharge pipe for each tank, a valve in each discharge pipe, a lever attached to the supply valve and to each discharge valve, means coupling all of said levers together and so arranged that as the valve in the supply pipe is opened or closed, the valve in each discharge pipe is simultaneously operated reversely by one movement of the operator, and adjustable means within each tank for controlling the amount of stored liquid therein that can be discharged from that tank, operable from outside the tank and independently of the adjustable means in the other tanks.

Signed at New York, in the county of New York and State of New York, this 25th day of May, A. D. 1927.

WILLIS B. KIRKPATRICK.